United States Patent [19]

Dunlop et al.

[11] Patent Number: 5,641,262
[45] Date of Patent: Jun. 24, 1997

[54] DIRECT LIFT

[75] Inventors: Norman T. Dunlop; Peter A. Dunlop, both of Woodbine; David J. Roden, Mondamin, all of Iowa

[73] Assignee: Woodbine Manufacturing, Woodbine, Iowa

[21] Appl. No.: 587,642

[22] Filed: Jan. 17, 1996

[51] Int. Cl.[6] .................................................. B60P 1/44
[52] U.S. Cl. ........................ 414/557; 414/545; 414/917; 414/556; 296/51; 296/57.1; 254/10 R
[58] Field of Search ..................................... 414/539, 540, 414/541, 542, 545, 546, 549, 554, 556, 557, 558, 917; 296/57.1, 50, 51; 254/10 R, 10 B, 10 C, 2 R, 2 B, 2 C

[56] References Cited

U.S. PATENT DOCUMENTS

| | | | |
|---|---|---|---|
| 1,929,112 | 10/1933 | Hansen | 414/557 |
| 2,391,813 | 12/1945 | Wood | 414/557 |
| 2,696,923 | 12/1954 | Messick | 414/557 |
| 3,180,503 | 4/1965 | Shaw . | |
| 3,305,112 | 2/1967 | Brown | 414/557 |
| 3,667,631 | 6/1972 | Bishop . | |
| 3,688,649 | 9/1972 | Hostetler | 92/110 |
| 3,887,092 | 6/1975 | Leet . | |
| 4,273,498 | 6/1981 | Dickhart, III et al. | 414/556 |
| 4,806,062 | 2/1989 | Stier | 414/545 |
| 4,813,842 | 3/1989 | Morton | 414/557 |
| 5,234,310 | 8/1993 | Driver | 414/540 |
| 5,391,039 | 2/1995 | Holtom | 414/917 X |

FOREIGN PATENT DOCUMENTS

| | | | |
|---|---|---|---|
| 101405 | 2/1984 | European Pat. Off. | 414/545 |
| 32508 | 3/1978 | Japan | 414/557 |

*Primary Examiner*—Frank E. Werner
*Attorney, Agent, or Firm*—O'Connor Cavanagh; John D. Titus

[57] ABSTRACT

This invention relates to hydraulic lift apparatus in general and to a hydraulically operated vehicular tailgate lift apparatus in particular.

7 Claims, 4 Drawing Sheets

DIRECT LIFT

BACKGROUND OF THE INVENTION

1. Field of the Invention

This invention relates to hydraulic lift apparatus in general and to a hydraulically operated vehicular tailgate lift apparatus in particular.

2. Description of Related Art

Vehicular tailgate lift assemblies are used on a variety of products such as large trucks, loading vans, and, in particular, pick-up trucks. While these assemblies have been successful in general, their use is still problematic for a number of reasons. Many of the systems are quite complex, using a series of pulleys and cables to raise the tailgate, as in U.S. Pat. Nos. 4,813,842 and 3,887,092. The complexity of these systems can create problems with the maintainability and reliability of the system.

Other systems use hydraulic cylinders to raise the platform, as in U.S. Pat. No. 3,688,649; however, these systems require two cylinders, which must be coordinated to assure even lifting, or they rely on one cylinder which can create problems with the stability of the lift platform. This instability of the platform can limit the ability to place loads on one side or one corner of the platform for lifting. Systems using a centrally located cylinder can resolve lift imbalances, but require more space and expose many of the moving parts to the elements. This creates maintenance problems due to contamination as well as safety problems due to the exposed machinery.

Accordingly, it is an object of this invention to provide a tailgate lifting assembly that directly applies equal lifting forces to both sides of the lift platform simultaneously.

Another object of this invention is to reduce the complexity and cost typically associated with tailgate lift assemblies.

Yet another object of the invention is to provide a tailgate lift assembly that is easy to use and to maintain.

A further object of this invention is to provide tailgate lift assembly that is compact and unobtrusive.

Another object of this invention is to provide a tailgate lift assembly where the lift mechanism is not exposed to the environment.

These and other objects of the invention are achieved in a vehicular tailgate lift assembly in accordance with the invention.

SUMMARY OF THE INVENTION

A tailgate lift assembly in accordance with the invention includes a main frame which is connected directly to the vehicle on which the lift is to be used. A dual output hydraulic rotatory actuator is supported within the main frame and is connected by means of shafts at either end to a set of hinge arms which are in turn connected to the lift platform. These shafts preferably protrude from either end of the rotary actuator, thus allowing the lifting force to be applied substantially equally to both sides of the lifting platform. When the actuator is operated, it rotates the shafts in the desired direction, which in turn rotate the hinge arms to either lift or lower the lift platform. Because only one actuator is used, and because it connects directly to the lifting mechanism, the complexity of the system is significantly reduced. Furthermore, the system is very compact and is thus able to be completely located within the main frame. This protects the mechanism from environmental contamination and improve safety by covering most of the moving parts.

BRIEF DESCRIPTION OF THE DRAWINGS

The present invention will be better understood from a reading of the following detailed description taken in conjunction with the accompanying drawing in which like reference designations indicate like elements and in which.

DETAILED DESCRIPTION

Figure 1:
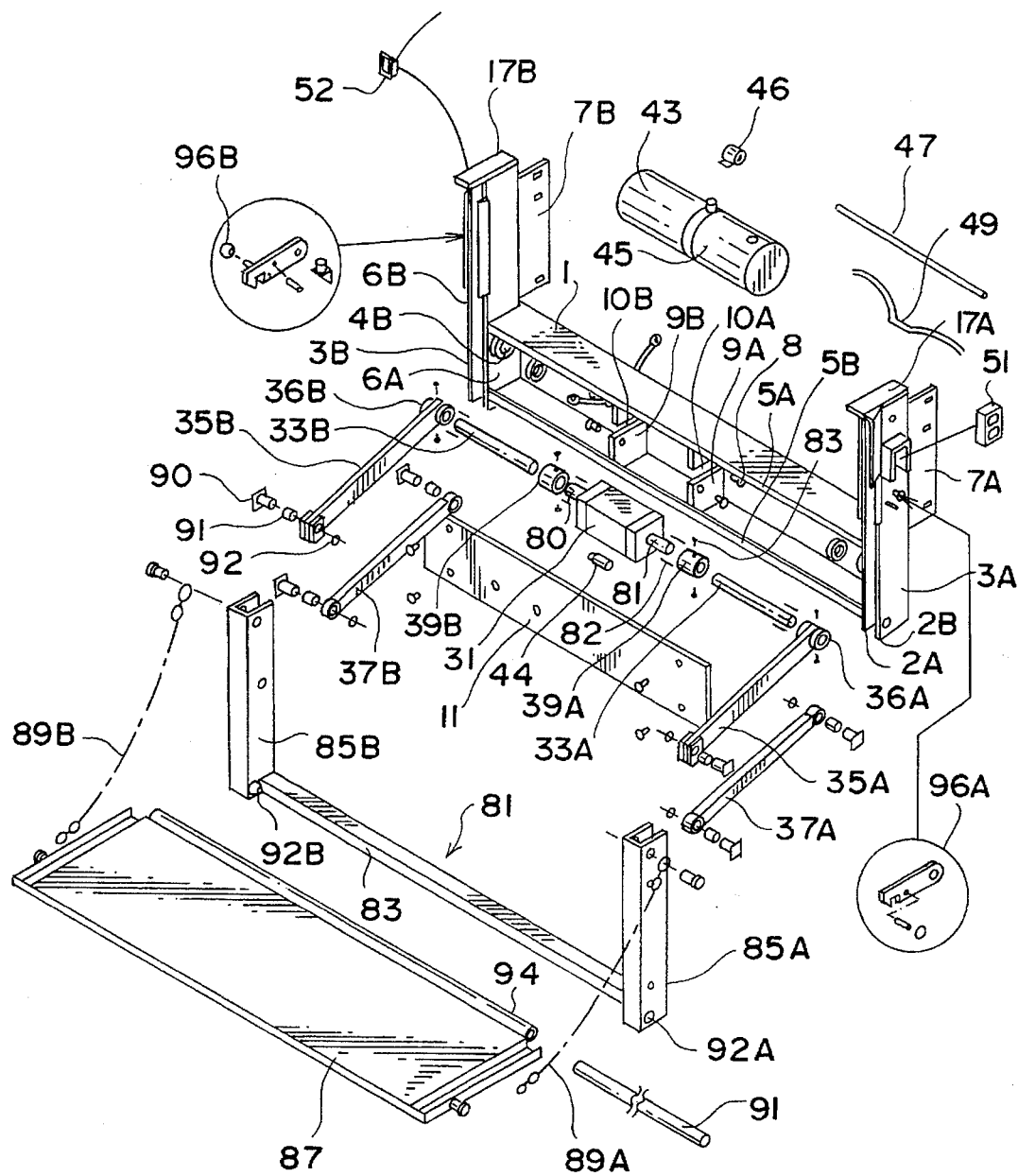
FIG. 1 is an exploded perspective view of the tailgate apparatus showing the component parts.

Referring to FIG. 1 the direct drive lift gate includes a mainframe 1 which is made up to two vertical brackets 3A, 3B which are joined by cross-members 5A, 5B. The mainframe 1 is constructed of a metal such as steel or aluminum, or any other suitably rigid material. The cross-members 5A, 5B are mounted horizontally between vertical brackets 3A, 3B and parallel to each other, with sufficient vertical space in between to house the rotary actuator 31 and the associated power train hardware. In another embodiment (not shown) a one piece, U-shaped channel may be substituted for the cross members 5A, 5B. This may increase the rigidity of the mainframe and reduce the part count, thereby simplifying construction of the device.

The vertical bracket 3A is made up of two vertical rigid plates 2A, 2B which are held parallel to each other and spaced sufficiently far apart so that upper hinge arms 35A, 35B can be pivotally supported between the two vertical plates 2A, 2B. The vertical plates 2A, 2B are fastened by welding or bolting to a spacing plate 17A which maintains the vertical plates 2A, 2B in their respective orientation. In an another embodiment (not shown), a one piece U-shaped channel may be substituted for the vertical brackets 3A, 3B. This may increase the rigidity of the mainframe and reduce the part count, thereby simplifying construction of the device. Vertical bracket 3B is a mirror image of vertical bracket 3A. The inside vertical plates 2A, 6A of the vertical brackets 3A, 3B have holes located between cross members 5A, 5B, through which shafts 33A, 33B are journalled. Bearings 8A, 8B are mounted in the holes 4A (not visible), 4B to allow free rotation of the shafts 33A, 33B. The vertical brackets 3A, 3B are permanently affixed to the cross-members 5A, 5B by means of a weld, or other mechanical means of attachment which assures a suitably rigid connection.

Two vertical actuator mount plates, 9A, 9B, are interposed between cross-members 5A, 5B. The vertical motor mounts 9A, 9B support the rotary actuator 31. In the illustrative embodiment, the actuator mounts 9A, 9B are welded to cross-members 5A, 5B, or may be secured with bolts or other conventional means.

The actuator mounts 9A, 9B are generally rectangular in shape and have slots 10A, 10B respectively cut therethrough to allow the rotary actuator 31 to be installed or removed without requiring removal of the actuator mounts 9A, 9B. The rotary actuator 31 is held to the actuator mounts 9A, 9B by screws 8 or other fastening means. The actuator mounts 9A, 9B may be made of a metal such as aluminum or steel, or some other suitably rigid material that will serve to properly secure the rotary actuator 31 to allow power to be transmitted from the rotary actuator 31 to the lift gate 87.

Figures 5A, 5B, 5C:
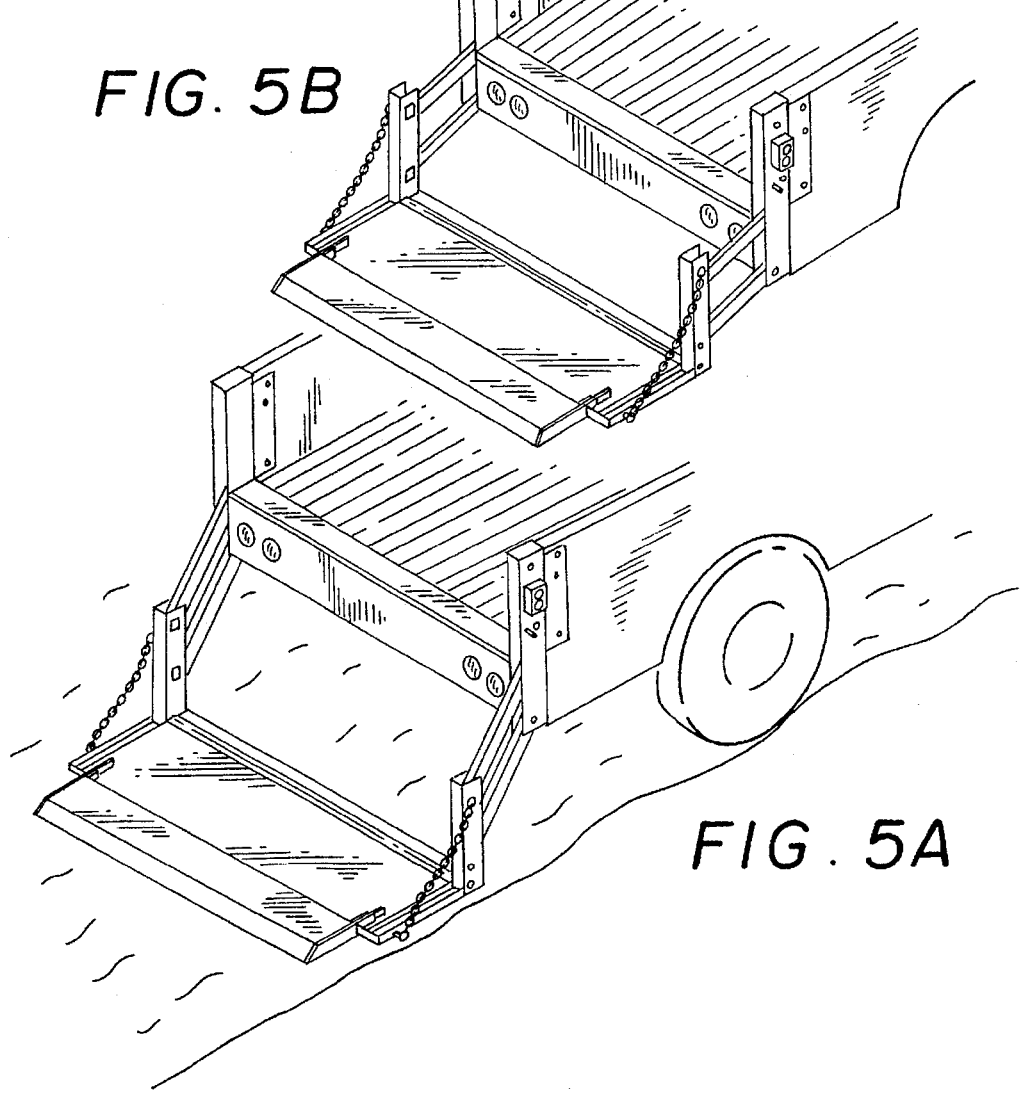
FIGS. 5A, 5B, 5C are perspective views of the apparatus of FIG. 1 in position on a pickup truck in three positions; and, FIG. 6 is a perspective view of the apparatus of FIG. 1 in its stored mode.

Attached to the upper portion of vertical brackets 3A, 3B are mounting brackets 7A, 7B which allow the entire mainframe 1 to be attached by conventional means to the rear of a vehicle as shown in FIGS. 5A, 5B and 5C onto which the lift gate is to be affixed. A cover plate 11 is attached to cross-members 5A, 5B enclosing the power train which includes the rotary actuator 31, and the shafts 33A, 33B.

Referring again to FIG. 1, the lifting force for the lift gate is provided by a rotary actuator 31 which, in the preferred embodiment, is hydraulically actuated. The hydraulic power can be provided through conventional means. In the illustrative embodiment, hydraulic pressure is provided by a hydraulic pump 43 which draws fluid from a hydraulic reservoir 45 and delivers hydraulic fluid under pressure through a fluid transfer line 47 to the rotary actuator 31. Fluid is returned to the reservoir 45 through a second fluid transfer line 49. The flow of hydraulic fluid is controlled at the reservoir 45 by a solenoid 46 and at the rotary actuator 31 by a flow control 44. The increase or decrease in pressure delivered by the pump 43 is controlled by a control switch 51. Also, the lift can be shut off from a remote location, typically the cab of the truck by means of a cut-off switch 52.

Figure 2:
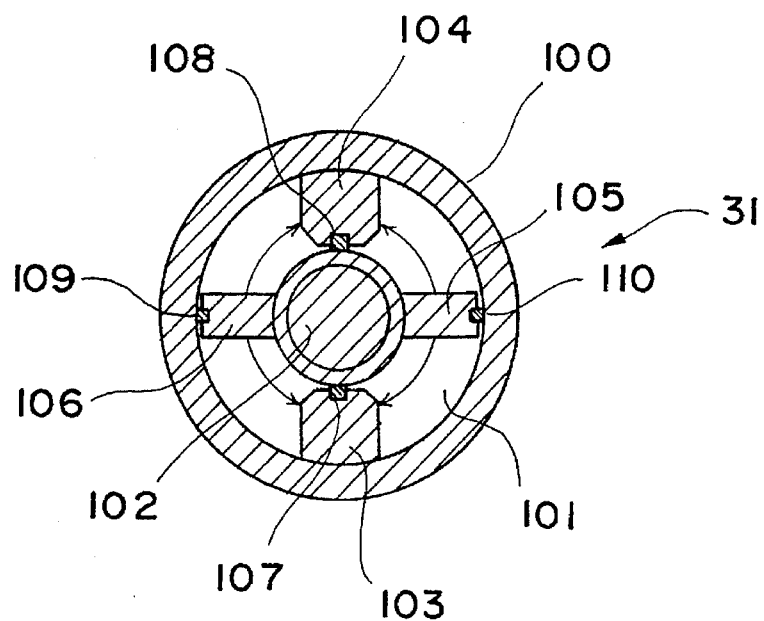
FIG. 2 is a cross section of the dual vane rotary actuator of the apparatus of FIG. 1.
Figure 3:
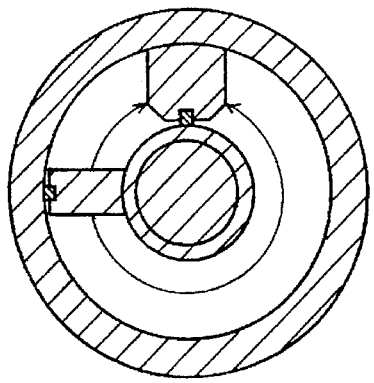
FIG. 3 is a cross section of the single vane rotary actuator which may be used in the apparatus of FIG. 1.

Referring to FIG. 2, in the illustrative embodiment, the hydraulic rotary actuator 31 is dual vane type hydraulic actuator of a type such as those produced by and commercially from the Reuter/Sollami Company. The actuator 31 is a fluid operated actuator made up of a hollow body 100 with head assemblies (not shown) mounted on both ends, creating a chamber 101 therein. A shaft 102 extends through the chamber 101 and through the head assemblies. Two radially disposed, longitudinal stators 103, 104 are mounted in the body between the head assemblies. Annular bearings (not shown) are fixed in the first and second head assemblies and the shaft 102 is journalled in the bearings. Two radially disposed, longitudinal vanes 105, 106 are mounted on the shaft 102 and extend from the first head assembly to the second head assembly. Seals 107, 108 are mounted on the stators 103, 104 to seal the stators 103, 104 to the shaft 102 and to the head assemblies. Second seals 109, 110 are mounted on vanes 105, 106 for sealing vanes 105, 106 to body 100 and to the head assemblies. Ports (not shown) are provided for selectively admitting fluid under pressure into chamber 101 to one side of stators 103, 104. As pressurized fluid is admitted into chamber 101 on selected and opposing sides of vanes 105, 106, a torque is created that rotates the shaft 102 in the selected direction. Other embodiments may utilize a single vane hydraulic rotary actuator as shown in FIG. 3 and as described in U.S. Pat. No. 4,495,856, which is incorporated herein by reference. Other forms of rotary actuators that may be know in the art, such as electromechanical actuators or other forms of rotary hydraulic actuators may also be used. If an electromechanical actuator is used, power may be drawn directly from the vehicle's electrical system or from an independent power system such as a battery.

Referring again to FIG. 1 the rotary actuator 31 has output shafts portions 80, 81 extending on either side (which are extensions of shaft 102), which are connected to shafts 33A, 33B by means of coupling shafts 39A, 39B. The coupling shafts 39A, 39B mount around the ends of the output shafts 80, 81 and shafts 33A, 33B. A plurality of locking pins 82 are mounted axially within the coupling shafts 39A, 39B at the interface between the coupling shafts 39A, 39B and the output shafts 80, 81 and shafts 33A, 33B. The locking pins 82 are held in place by locking screws 83. In an alternative embodiment (not shown), the output shafts 80, 81 are joined to shafts 33A, 33B by splines. Other conventional means for joining shafts as may be known in the art may also be used.

Shafts 33A, 33B are rigidly connected to upper hinge arms 35A, 35B in a similar fashion, except that coupling shaft 36A, 36B are welded directly to the upper hinge arms 35A, 35B. The shafts 33A, 33B are journalled through the inner vertical plates 2A, 6A of the vertical brackets 3A, 3B by means of roller bearings 8A, 8B which allow shafts 33A, 33B to freely rotate. Other forms of bearings as may be known in the ark may also be used, provided that the shafts 33A, 33B are allowed to freely rotate.

Upper hinge arms 35A, 35B are pivotally attached to lift frame 81. The pivotal attachment may be made up of a pin 90, a bushing 91 and a snap ring 92 which holds the pin in place, or other conventional pivots may be used. Lower hinge arms 37A, 37B are pivotally attached by similar means to vertical brackets 3A, 3B and lift frame 81.

The lift platform consists of a lift frame 81 which is hingeably attached to a lift gate 87. The lift frame 81 includes a cross-member 83 which is a substantially rigid unit which may be made up of metals such as aluminum, steel, iron, or other suitably rigid material. Attached to cross-member 83 are vertical mounts 85A, 85B. The mounts 85A, 85B are "U" shaped pieces of metal and are welded to cross-member 83 or otherwise affixed in a substantially permanent and rigid manner. The vertical mounts 85A, 85B are mounted in such a way that the open end of the "U" faces the mainframe 1 so that the upper and lower hinge arms 35A, 35B, 37A, 37B can be nestled in the opening of the "U" when the lift is in the raised position. Furthermore, the width of the vertical mounts 85A, 85B is sufficiently narrow that when the lift gate 87 is raised to its upright position, the vertical mounts 85A, 85B will nestle within the space formed between the vertical plates 2A, 2B, 6B making up the vertical brackets 3A, 3B. This allows the lift gate 87 to be drawn flush to the mainframe 1 when in the raised position so that there is no gap between the gate 87 and the mainframe 1.

Figure 4:
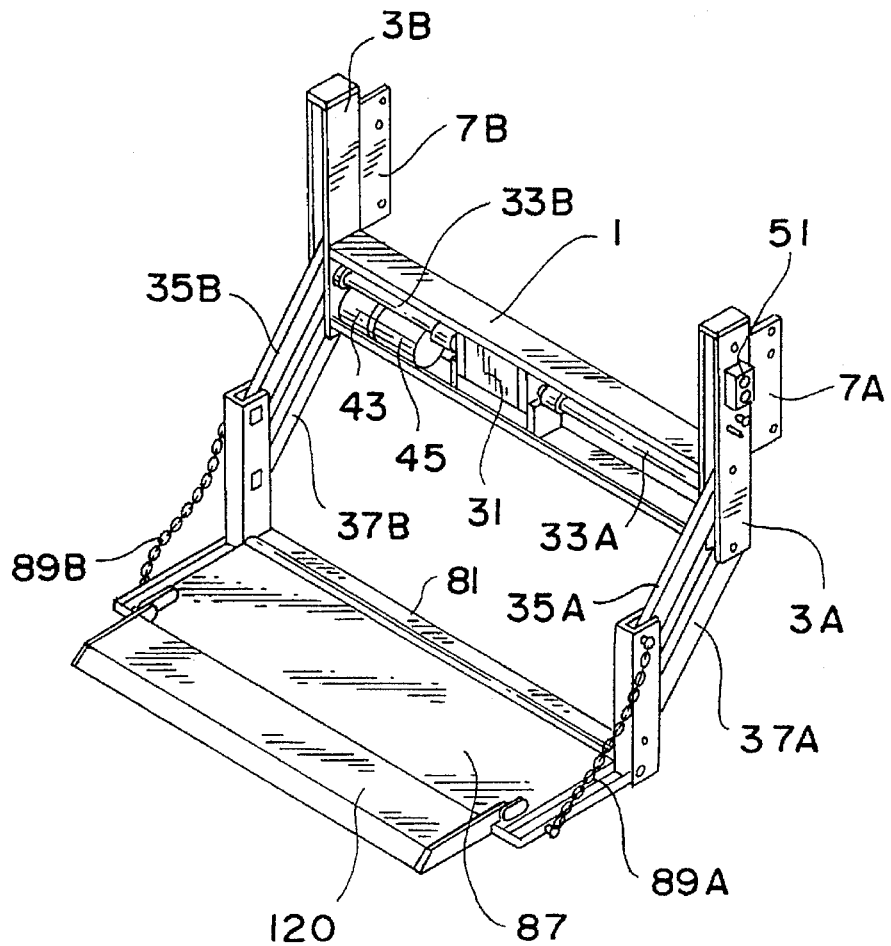
FIG. 4 is a perspective view of the lift apparatus as assembled, with the cover plate removed.

Lift gate 87 provides the lifting surface for the apparatus. It comprises a rectangular platform of the general dimensions of a conventional pickup truck tailgate. It is comprised of a suitable rigid material such as steel or aluminum and can be solid or braced. Lift gate 87 may also be sized larger than a conventional tailgate and hinged to allow storage with conventional dimensions as shown in FIG. 4. Tailgate extension 120 is pivotally mounted on the free end of gate 87. The lift gate 87 is attached to the lift frame 81 by means of a hinge. The hinge is formed by inserting a hinge pin 91 through holes 92A, 92B drilled in the bottoms of the vertical mounts 85A, 85B and inserted through a tube 94 which is affixed to the vehicle side of the lift gate 87. Other conventional forms of pivotal attachments may be employed. When opened, the lift gate 87 is maintained in a horizontal position by means of two lift cables 89A, 89B which are each affixed at one end to the top of the vertical mounts 85A, 85B and at the other ends to the outer edge of the lift gate 87. Chains or other flexible material may be used as lift cables.

Figure 6:
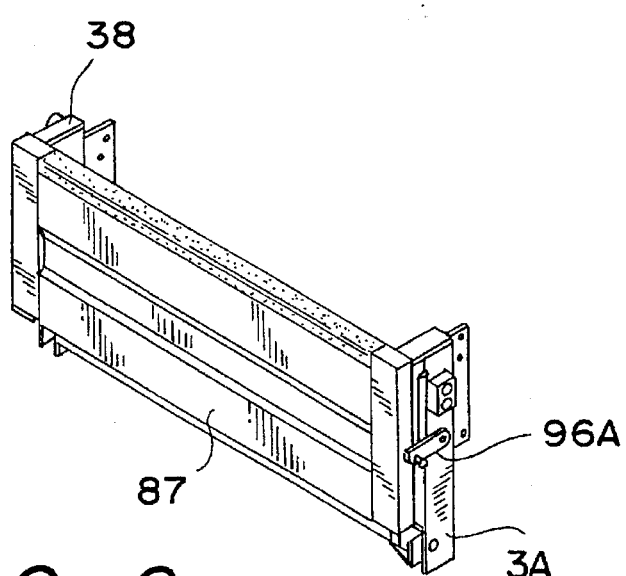

FIG. 4 illustrates the apparatus in its assembled state. Plate 11 is not shown so that the internal components may be seen. To operate the lift gate, the rotary actuator is activated to provide a torque to the shafts 33A, 33B. When the shafts are rotated in the upward direction, they rotate the upper hinge arms 35A, 35B, thus drawing the lift frame 81 in the upward direction. As seen in FIG. 5A, when the lift is fully lowered the lift gate 87 lies against the ground. As in FIG. 5C, when fully elevated, the lift gate 87 is flush with the mainframe 1 and therefore, flush with the bed of the truck. As seen in FIG. 6, in the elevated position, the lift gate 87 can be folded up and locked in the closed position by means of side latches 96A, 96B.

In accordance with the principles of the invention, the lift assembly provides a lifting force to both left and right sides of the lift platform simultaneously through simple and direct mechanical means. By centering the power source relative to the frame and eliminating pulleys or gearing to transmit power, even application of force to both sides is assured. Maintenance is reduced also due to the reduced complexity of the apparatus. Also, by using torsion rather than direct force to lift the platform, the mechanism is much more compact. As can be seen in FIG. 4, the entire lifting mechanism can be located within the main frame 1. This allows the mechanism to be sealed off from the environment by the cover plate 11 (not shown), which prevents contamination and further reduced maintenance. Safety is also improve by virtue of the enclosed drive train.

The apparatus shown is designed for use with conventional pickup trucks, however, the apparatus can be scaled up or down for use in different applications. For example, the lift can be used in a loading dock, or scaled up for use on larger trucks.

Although certain preferred embodiments and methods have been disclosed herein, it will be apparent from the foregoing disclosure to those skilled in the art that variations and modifications of such embodiments and methods may be made without departing from the true spirit and scope of the invention. Accordingly, it is intended that the invention shall be limited only to the extent required by the appended claims and the rules and principles of applicable law.

What is claimed:

1. A vehicular tailgate lift, comprising:
    a mounting frame adapted for attachment to the rear end of a vehicle;
    a lift frame;
    a left and right set of parallel bar linkages disposed at opposite ends of said mounting frame for connecting said lift frame to said mounting frame, said left set of parallel bar linkages comprising:
        first and second hinge arms of substantially equal length, said first and second hinge arms each having an inner end attached with a pivotal attachment to a left end of said mounting frame and an outer end attached with a pivotal attachment to said lift frame, said pivotal attachments arranged to maintain said first and second hinge arms in a parallel, spaced-apart configuration, said first hinge arm further including a left torsion shaft affixed to said inner end thereof, said left torsion shaft extending inward from said first hinge arm toward a center of said mounting frame;
    said right set of parallel bar linkages comprising:
        first and second hinge arms of substantially equal length, said first and second hinge arms each having an inner end attached with a pivotal attachment to a right end of said mounting frame and an outer end attached with a pivotal attachment to said lift frame, said pivotal attachments arranged to maintain said first and second hinge arms in a parallel, spaced-apart configuration, said first hinge arm further including a right torsion shaft affixed to said inner end thereof, said right torsion shaft extending inward from said first hinge arm toward the center of said mounting frame;
    a rotary actuator disposed between said left and right set of parallel bar linkages, said rotary actuator comprising a housing with a single driven shaft extending therethrough to form left and right output shafts at opposite ends of said housing;
    means for coupling said left and right output shafts respectively to said left and right torsion shafts, each of said coupling means being removable to permit disengagement of said rotary actuator from said torsion shaft without moving said torsion shaft; and
    a gate having a hinged end and a free end wherein said hinged end is pivotally attached to a bottom end of said lift frame.

2. The apparatus of claim 1, where said rotary actuator is positioned at the center of said mounting frame.

3. The apparatus of claim 1, where said rotary actuator is an electromechanical actuator.

4. The apparatus of claim 1, where said rotary actuator is a single vane hydraulic actuator.

5. The apparatus of claim 1, where said rotary actuator is a dual vane hydraulic actuator.

6. The apparatus of claim 1, further comprising at least one flexible gate restraint with two ends wherein one end is attached to a top of said lift frame and the other end is attached to the free end of said gate.

7. A vehicular tailgate lift as recited in claim 1, wherein said means for coupling comprises:
    a first collar slidably disposed about said left output shaft and said left torsion shaft and keyed thereto; and
    a second collar slidably disposed about said right output shaft and said right torsion shaft and keyed thereto.

* * * * *